United States Patent
Watanabe et al.

(10) Patent No.: US 12,546,543 B2
(45) Date of Patent: Feb. 10, 2026

(54) HEAT STORAGE POWER GENERATION SYSTEM AND POWER GENERATION CONTROL SYSTEM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Hironori Watanabe, Yokohama Kanagawa (JP); Keiko Shimizu, Kawasaki Kanagawa (JP); Naoto Nakagawa, Yokohama Kanagawa (JP); Masakazu Shirakawa, Yokohama Kanagawa (JP); Atsushi Matsuzaki, Sagamihara Kanagawa (JP); Hiromutsu Miki, Yokohama Kanagawa (JP); Toyohiro Akebi, Tokyo (JP); Taufiq Hilal Tawab, Tokyo (JP); Takahiro Mori, Yokohama Kanagawa (JP); Yusuke Fukamachi, Tokyo (JP); Syuntaro Abe, Tokyo (JP); Chikako Iwaki, Tokyo (JP); Takashi Mawatari, Kawasaki Kanagawa (JP)

(73) Assignees: KABUSHIKI KAISHA TOSHIBA, Tokyo (JP); TOSHIBA ENERGY SYSTEMS & SOLUTIONS CORPORATION, Kawasaki (JP)

(*) Notice: Subject to any disclaimer, the term of this patent is extended or adjusted under 35 U.S.C. 154(b) by 111 days.

(21) Appl. No.: 18/570,944

(22) PCT Filed: Nov. 30, 2021

(86) PCT No.: PCT/JP2021/043886
§ 371 (c)(1),
(2) Date: Dec. 15, 2023

(87) PCT Pub. No.: WO2022/264452
PCT Pub. Date: Dec. 22, 2022

(65) Prior Publication Data
US 2024/0288224 A1 Aug. 29, 2024

(30) Foreign Application Priority Data
Jun. 18, 2021 (JP) ................... 2021-101958

(51) Int. Cl.
*F28D 20/00* (2006.01)
*F28D 20/02* (2006.01)

(52) U.S. Cl.
CPC ....... *F28D 20/0056* (2013.01); *F28D 20/021* (2013.01)

(58) Field of Classification Search
CPC ........ F28D 20/00; F28D 20/02; F28D 20/021; F28D 20/0056; F22B 1/02; F28F 27/02; Y02E 60/14
See application file for complete search history.

(56) References Cited

U.S. PATENT DOCUMENTS

| | | | | |
|---|---|---|---|---|
| 4,137,898 A * | 2/1979 | Koizumi | ............... | F24D 11/007 126/609 |
| 4,304,219 A * | 12/1981 | Currie | ................... | F24D 19/109 126/609 |
| 4,362,149 A * | 12/1982 | Thomson | .............. | F24D 11/007 165/104.34 |

(Continued)

FOREIGN PATENT DOCUMENTS

| CN | 106123086 A | 11/2016 |
|---|---|---|
| EP | 3 245 467 B1 | 11/2017 |

(Continued)

OTHER PUBLICATIONS

International Search Report and Written Opinion in corresponding PCT Application No. PCT/JP2021/043886 dated Jan. 11, 2022, with partial English translation.
U.S. Appl. No. 18/274,413, filed Jul. 26, 2023, Kabushiki Kaisha Toshiba et al.

*Primary Examiner* — Harry E Arant
(74) *Attorney, Agent, or Firm* — Foley & Lardner LLP

(57) ABSTRACT

In one embodiment, a heat storage power generation system includes a heater to heat first fluid, and a heat storage to be heated by the first fluid, and heat second fluid with heat stored in the heat storage. The system further includes a (Continued)

generator to generate electric power by using the second fluid, and one or more first path switchers provided on a first path through which the first fluid is circulated between the heater and heat storage. The system further includes one or more second path switchers provided on a second path through which the second fluid is circulated between the heat storage and generator, one or more third path switchers provided on a third path through which at least one of the first and second fluids is circulated between the heater and generator, and a switching controller to control the first, second and third path switchers.

5 Claims, 8 Drawing Sheets

(56) References Cited

U.S. PATENT DOCUMENTS

| | | |
|---|---|---|
| 2008/0066736 A1 | 3/2008 | Zhu |
| 2008/0289793 A1 | 11/2008 | Geiken et al. |
| 2011/0277471 A1 | 11/2011 | Shinnar |
| 2014/0251310 A1 | 9/2014 | Muren et al. |
| 2015/0167648 A1 | 6/2015 | Bergan |

FOREIGN PATENT DOCUMENTS

| | | |
|---|---|---|
| EP | 3 327 399 B1 | 5/2018 |
| EP | 3 322 955 B1 | 6/2019 |
| JP | 2022-158322 A | 10/2022 |
| WO | WO-2016/150462 A1 | 9/2016 |
| WO | WO-2017/055440 A1 | 4/2017 |

* cited by examiner

HEAT STORAGE POWER GENERATION SYSTEM AND POWER GENERATION CONTROL SYSTEM

CROSS REFERENCE TO RELATED APPLICATION

This application is based upon and claims the benefit of priority from the prior Japanese Patent Application No. 2021-101958, filed on Jun. 18, 2021 and the prior International Patent Application No. PCT/JP2021/043886, filed on Nov. 30, 2021, the entire contents of which are incorporated herein by reference.

FIELD

Embodiments described herein relate to a heat storage power generation system and a power generation control system.

BACKGROUND

Various heat storage power generation systems have been proposed. A heat storage power generation system includes a heat storage including a heat storage material, and a power generator configured to generate electric power by using heat stored in the heat storage material.

For example, technologies of managing the temperature of heat transfer fluid transferred from the heat storage to the power generator and technologies of setting the gradient of distribution of the internal temperature of the heat storage to a desired gradient have been proposed. In addition, technologies of managing the amount of energy that heats the heat storage material to a constant value by measuring the temperature of the heat transfer fluid upstream of the entrance of the heat storage and downstream of the exit thereof when the heat storage is operated in a heat storage mode have been proposed. Furthermore, technologies that the power generator generates electric power by using a steam turbine cycle when the heat storage is operated in a heat releasing mode have been proposed.

In the heat storage mode, the heat storage material in the heat storage is heated by some means, for example, the heat transfer fluid at high temperature. Then, as the temperature of the heat storage material increases, energy is stored in the heat storage. The heat transfer fluid at high temperature is produced by, for example, electric power generated by using natural energy. The electric power is surplus electric power that exceeds electric power needed by, for example, an electric power system.

In the heat releasing mode, the heat storage material in the heat storage releases heat to some means, for example, the heat transfer fluid at low temperature. The heat transfer fluid at low temperature is heated by receiving thermal energy from the heat storage material. Accordingly, thermal energy in the heat storage material decreases. The heat transfer fluid heated in the heat storage is transferred to the power generator and supplies thermal energy to the steam turbine cycle in the power generator. The power generator generates electric power by using the thermal energy.

DETAILED DESCRIPTION

Figure 1:
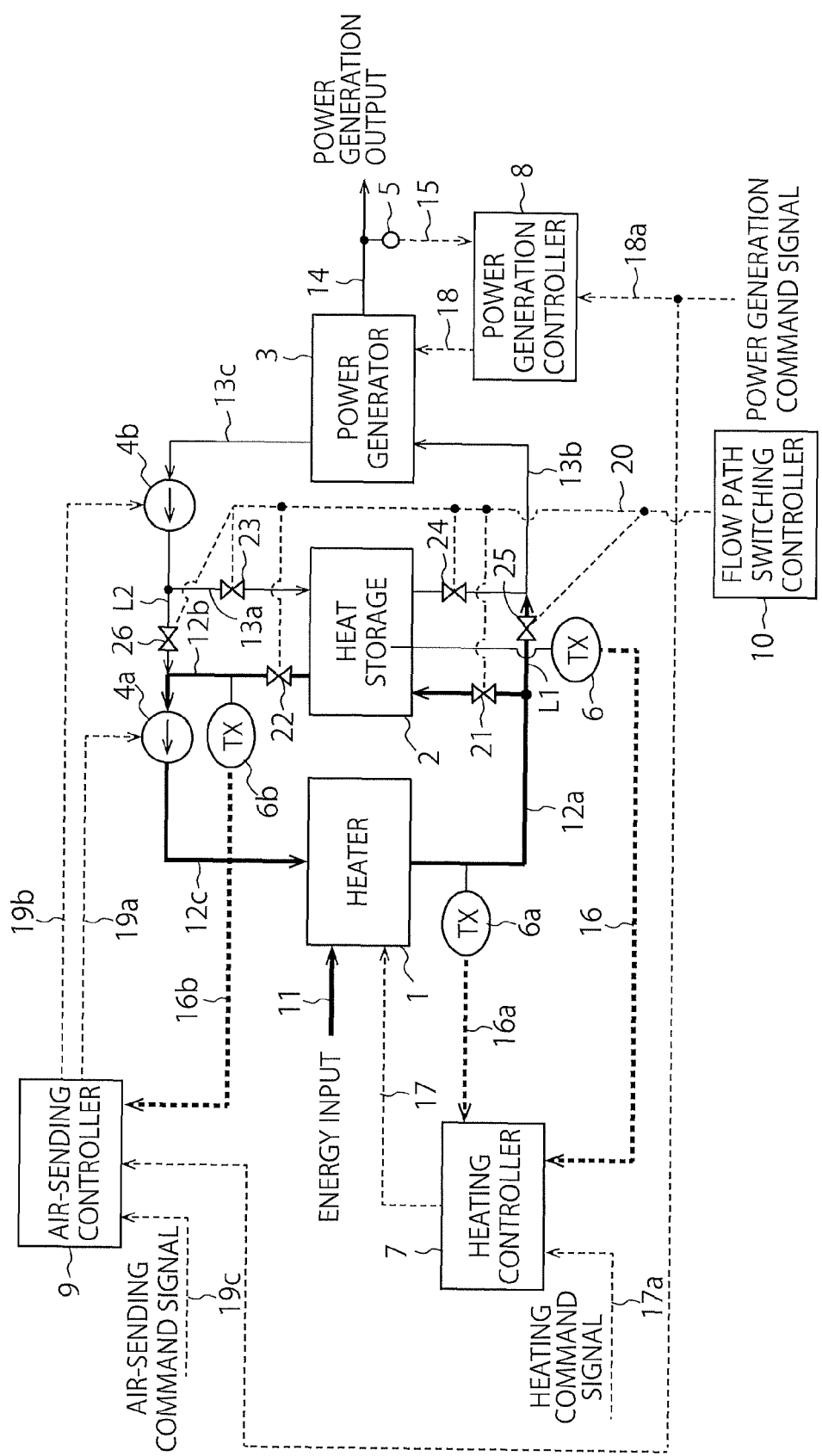
FIG. 1 is a schematic diagram illustrating the configuration of a heat storage power generation system of a first embodiment.

Embodiments will now be explained with reference to the accompanying drawings. In FIGS. 1 to 8, identical components are denoted by the same reference sign and duplicate description thereof is omitted.

In a heat storage power generation system as described above, for example, operation in a heat storage mode and operation in a heat releasing mode are alternately performed. However, in a case in which electric power used in the heat storage mode is surplus electric power relying on natural energy, the surplus electric power is not necessarily abundant every day. When the surplus electric power is not abundant, operation in the heat storage mode may be performed several days after the end of the previous operation in the heat releasing mode, and thereafter the latest operation in the heat releasing mode may be performed.

In such a case, the temperature of internal components of the power generator significantly falls from the end of the operation in the heat storage mode until the start of the latest operation in the heat releasing mode. When power generation is started while the temperature of the internal components is low, warm-up operation is needed for sufficiently increasing the temperature of the internal components. The warm-up operation is performed by using, for example, thermal energy stored in the heat storage. In this case, the amount of power generated by the power generator decreases by an amount corresponding to thermal energy used in the heat storage for warming up, which is not preferable. Furthermore, since power generation output of the power generator is zero during the warm-up operation, a long time is needed for warming up the power generator, which is not preferable as well.

On the other hand, in operation in the heat storage mode, not all surplus electric power can be consumed in some cases. The surplus electric power is desirably consumed as much as possible from a viewpoint of effective use of energy.

In one embodiment, a heat storage power generation system includes a heater configured to heat first heat transfer fluid, and a heat storage including a heat storage material heated by the first heat transfer fluid, and configured to heat second heat transfer fluid with heat stored in the heat storage material. The system further includes a power generator configured to generate electric power by using the second heat transfer fluid, and one or more first flow path switchers provided on a first flow path through which the first heat transfer fluid is circulated between the heater and the heat storage. The system further includes one or more second flow path switchers provided on a second flow path through which the second heat transfer fluid is circulated between the heat storage and the power generator, and one or more third flow path switchers provided on a third flow path through which at least one of the first and second heat transfer fluids is circulated between the heater and the power generator. The system further includes a flow path switching controller configured to control the first, second and third flow path switchers.

First Embodiment

[A] Overall Configuration

FIG. 1 is a schematic diagram illustrating the configuration of a heat storage power generation system of a first embodiment.

The heat storage power generation system of the present embodiment includes a heater 1, a heat storage 2, a power generator 3, a first air sender 4a, a second air sender 4b, a power generation output meter 5, temperature meters 6, 6a, and 6b, a heating controller 7, a power generation controller 8, an air-sending controller 9, a flow path switching controller 10, and flow path switchers 21, 22, 23, 24, 25, and 26. The flow path switchers 21 and 22 are examples of a first flow path switcher, the flow path switchers 23 and 24 are examples of a second flow path switcher, and the flow path switchers 25 and 26 are examples of a third flow path switcher. The power generation output meter 5, the temperature meters 6, 6a, and 6b, the heating controller 7, the power generation controller 8, the air-sending controller 9, the flow path switching controller 10, and the flow path switcher 21 to 26 constitute a power generation control system that controls the heat storage power generation system of the present embodiment.

Figure 2:
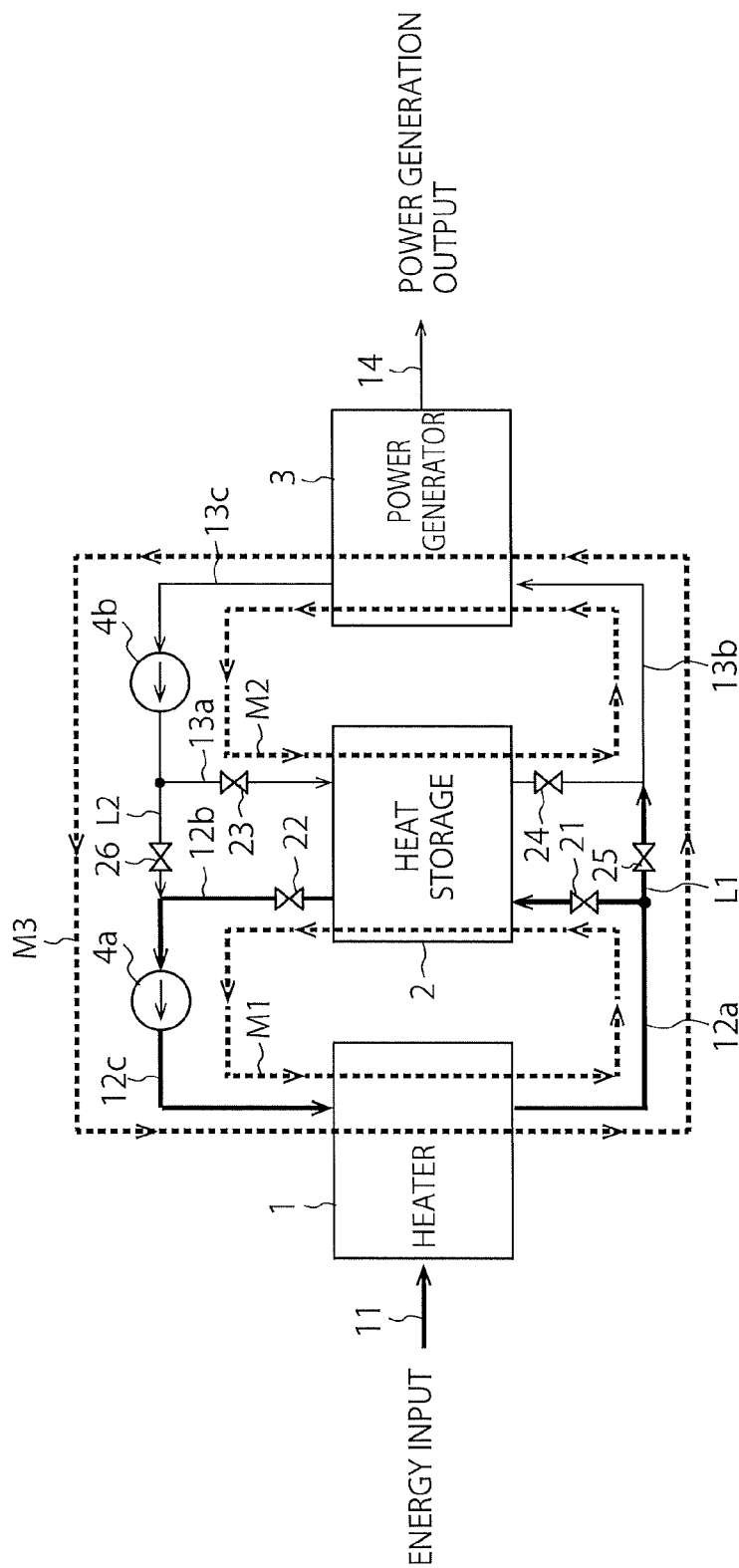
FIG. 2 is a schematic diagram for description of operation of the heat storage power generation system of the first embodiment.

The configuration of the heat storage power generation system of the present embodiment will be described below with reference to FIG. 1. FIG. 2 is referred as appropriate in the description. FIG. 2 is a schematic diagram for description of operation of the heat storage power generation system of the present embodiment.

[A-1] Heater 1

FIG. 1 illustrates energy input 11 to the heater 1. The heater 1 of the present embodiment receives electric power as the energy input 11 and converts the electric power into heat by using a heat generating source such as an electric heater. In addition, the heater 1 of the present embodiment heats heat transfer fluid 12c at low temperature by using the heat and generates heat transfer fluid 12a at high temperature. The heater 1 may convert energy other than electric power into heat. For example, the heat transfer fluids denoted by reference signs 12a and 12c are examples of first heat transfer fluid.

[A-2] Heat Storage 2

The heat storage 2 includes a heat storage material (not illustrated) and can store heat in the heat storage material. The heat storage material is, for example, a crushed rock. The heat storage 2 of the present embodiment is operated in, for example, a heat storage mode or a heat releasing mode.

In the heat storage mode, the heat transfer fluid 12a at high temperature enters the heat storage 2. The heat storage material in the heat storage 2 is heated with the heat transfer fluid 12a. Accordingly, the temperature of the heat storage material rises. Simultaneously, the temperature of the heat transfer fluid 12a falls, and the heat transfer fluid 12a becomes a heat transfer fluid 12b at low temperature and is discharged to the outside of the heat storage 2. In this manner, in the heat storage mode, thermal energy is stored in the heat storage 2 as the temperature of the heat storage material in the heat storage 2 rises.

Hereinafter, the heat transfer fluids 12a, 12b, and 12c are also collectively referred to as "heat transfer fluid 12". Reference sign M1 in FIG. 2 denotes a situation in which the heat transfer fluid 12 circulates between the heater 1 and the heat storage 2 in the heat storage mode. The flow path of the heat transfer fluid 12 denoted by reference sign M1 is an example of a first flow path. Hereinafter, this flow path is also referred to as a "heat storage flow path M1".

In the heat releasing mode, heat transfer fluid 13a at low temperature enters the heat storage 2. Heat of the heat storage material in the heat storage 2 is absorbed by the heat transfer fluid 13a, in other words, the heat storage material releases heat to the heat transfer fluid 13a. Accordingly, the temperature of the heat storage material falls. Simultaneously, the temperature of the heat transfer fluid 13a rises, and the heat transfer fluid 13a becomes heat transfer fluid 13b at high temperature and is discharged to the outside of the heat storage 2. In this manner, in the heat releasing mode, the temperature of the heat storage material falls as the heat storage material in the heat storage 2 discharges thermal energy. For example, the heat transfer fluids denoted by reference signs 13a and 13b are examples of second heat transfer fluid.

The heat transfer fluid 12a flows from the lower side to the upper side in the heat storage 2 in illustration of FIG. 1, but in reality, does not necessarily flow from the lower side to the upper side and may flow, for example, from the uppers side to the lower side, from the right side to the left side, or from the left side to the right side. Similarly, the heat transfer fluid 13a flows from the uppers side to the lower side in the heat storage 2 in illustration of FIG. 1, but in reality, does not necessarily flow from the uppers side to the lower side and may flow, for example, from the lower side to the upper side, from the left side to the right side, or from the right side to the left side. FIG. 1 schematically illustrates the directions in which the heat transfer fluid 12a, the heat transfer fluid 13a, and the like flow.

[A-3] Power Generator 3

The power generator 3 generates electric power by using heat of the heat transfer fluid 13b at high temperature. The power generator 3 of the present embodiment includes a steam turbine, an electric generator, a heat exchanger, a steam condenser, and the like that constitute a steam turbine cycle. In this case, the power generator 3 generates steam from water with heat of the heat transfer fluid 13b, drives the steam turbine with the steam, drives the electric generator with the steam turbine, and generates electric power with the electric generator. FIG. 1 illustrates power generation output 14 from the power generator 3. Simultaneously, the temperature of the heat transfer fluid 13b falls, and the heat transfer fluid 13b becomes heat transfer fluid 13c at low temperature and is discharged to the outside of the power generator 3. The power generator 3 may generate electric power by using heat of the heat transfer fluid 13b in any other manner than the steam turbine cycle. The power generator 3 of the present embodiment is operated in, for example, the heat releasing mode or a warm-up mode.

In the heat releasing mode, the heat transfer fluid 13b at high temperature enters the power generator 3. As described above, the power generator 3 generates electric power by using heat of the heat transfer fluid 13b. As a result, the temperature of the heat transfer fluid 13b falls, and the heat transfer fluid 13b becomes the heat transfer fluid 13c at low temperature and is discharged to the outside of the power generator 3.

Hereinafter, the heat transfer fluids 13a, 13b, and 13c are also collectively referred to as "heat transfer fluid 13". Reference sign M2 in FIG. 2 denotes a situation in which the heat transfer fluid 13 circulates between the heat storage 2 and the power generator 3 in the heat releasing mode. The flow path of the heat transfer fluid 13 denoted by reference sign M2 is an example of a second flow path. Hereinafter, this flow path is also referred to as a "heat-releasing flow path M2".

In the warm-up mode, the heat transfer fluids 12 and 13 circulate between the heater 1 and the power generator 3. Reference sign M3 in FIG. 2 denotes a situation in which the heat transfer fluids 12 and 13 circulates between the heater 1 and the power generator 3 in the warm-up mode. In the warm-up mode of the present embodiment, the heat transfer fluids 12 and 13 do not pass through the heat storage 2. The flow path of the heat transfer fluids 12 and 13 denoted by reference sign M3 is an example of a third flow path. Hereinafter, this flow path is also referred to as a "warm-up flow path M3".

The warm-up flow path M3 includes a portion of the heat storage flow path M1, a portion of the heat-releasing flow path M2, a connecting flow path L1, and a connecting flow path L2. The heat transfer fluid 12a in the heat storage flow path M1 can be supplied into the heat-releasing flow path M2 through the connecting flow path L1. The heat transfer fluid 13c in the heat-releasing flow path M2 can be supplied into the heat storage flow path M1 through the connecting flow path L2. With this configuration, in the warm-up mode, the heat transfer fluid 12 and the heat transfer fluid 13 are mixed, and the mixed heat transfer fluids 12 and 13 circulate between the heater 1 and the power generator 3. The connecting flow path L1 is an example of a first portion, and the connecting flow path L2 is an example of a second portion.

In the warm-up mode, the heat transfer fluids 12 and 13 at low temperature enter the heater 1. The heater 1 heats the heat transfer fluids 12 and 13 at low temperature by using the above-described heat and generates the heat transfer fluids 12 and 13 at high temperature. In the warm-up mode, the heat transfer fluids 12 and 13 at high temperature enter the power generator 3. The power generator 3 is warmed up with the heat transfer fluids 12 and 13 at high temperature. As a result, the temperatures of the heat transfer fluids 12 and 13 at high temperature fall, and the heat transfer fluids 12 and 13 at high temperature become the heat transfer fluids 12 and 13 at low temperature and are discharged from the power generator 3 to the heater 1. In this manner, in the warm-up mode, the power generator 3 is directly warmed up with the heat transfer fluids 12 and 13 from the heater 1.

The heat transfer fluids 12 and 13 flow from the lower side to the upper side in the power generator 3 in illustration of FIGS. 1 and 2, but in reality, do not necessarily flow from the lower side to the upper side and may flow, for example, from the uppers side to the lower side, from the right side to the left side, or from the left side to the right side. Similarly, the heat transfer fluids 12 and 13 flow from the uppers side to the lower side in the heater 1 in illustration of FIGS. 1 and 2, but in reality, do not necessarily flow from the uppers side to the lower side and may flow, for example, from the lower side to the upper side, from the left side to the right side, or from the right side to the left side. FIGS. 1 and 2 schematically illustrate the directions in which the heat transfer fluids 12 and 13 flow.

In the warm-up mode of the present embodiment, the mixed heat transfer fluids 12 and 13 circulate between the heater 1 and the power generator 3, but only the heat transfer fluid 12 may circulate between the heater 1 and the power generator 3 or only the heat transfer fluid 13 may circulate between the heater 1 and the power generator 3. Moreover, in the warm-up mode of the present embodiment, the heat transfer fluid 12 and the heat transfer fluid 13 may circulate between the heater 1 and the power generator 3 while being not mixed with each other.

In the warm-up mode of the present embodiment, the mixed heat transfer fluids 12 and 13 circulates between the heater 1 and the power generator 3. Accordingly, when the mode of the heat storage power generation system of the present embodiment is returned from the warm-up mode to the heat storage mode or the heat releasing mode, the heat transfer fluids 12 and 13 existing in the heat storage flow path M1 at the returning become the heat transfer fluid 12 for the heat storage mode and the heat transfer fluids 12 and 13 existing in the heat-releasing flow path M2 at the returning become the heat transfer fluid 13 for the heat releasing mode. For this reason, the heat transfer fluid 12 and the heat transfer fluid 13 of the present embodiment are desirably heat transfer fluids of the same kind.

[A-4] First Air Sender 4a and Second Air Sender 4b

The first air sender 4a is used to cause the heat transfer fluid 12b discharged from the heat storage 2 to flow to the heater 1 in the heat storage mode. In FIG. 1, heat transfer fluid flowing toward the first air sender 4a is denoted by reference sign 12b, and heat transfer fluid having passed through the first air sender 4a is denoted by reference sign 12c. The heat transfer fluid 12c enters the heater 1, is heated in the heater 1 to become the heat transfer fluid 12a at high temperature, and is discharged to the outside of the heater 1. In this manner, the first air sender 4a distributes (circulates) the heat transfer fluids 12a, 12b, and 12c between the heater 1 and the heat storage 2.

The second air sender 4b is used to cause the heat transfer fluid 13c discharged from the power generator 3 to flow to the heat storage 2 in the heat releasing mode. In FIG. 1, heat transfer fluid flowing toward the second air sender 4b is denoted by reference sign 13c, and heat transfer fluid having passed through the second air sender 4b is denoted by reference sign 13a. The heat transfer fluid 13a enters the heat storage 2, is heated in the heat storage 2 to become the heat transfer fluid 13b at high temperature, and is discharged to the outside of the heat storage 2. In this manner, the second air sender 4b distributes (circulates) the heat transfer fluids 13a, 13b, and 13c between the heat storage 2 and the power generator 3.

Depending on an operation purpose, the first air sender 4a causes the heat transfer fluid 12c to flow to the heater 1 at a constant flow rate or controls the flow rate of the heat transfer fluid 12c to a flow rate set value that varies. Similarly, depending on an operation purpose, the second air sender 4b causes the heat transfer fluid 13a to flow to the heat storage 2 at a constant flow rate or controls the flow rate of the heat transfer fluid 13a to a flow rate set value that varies. In any case, operation of the first air sender 4a and the second air sender 4b is controlled by the air-sending controller 9.

The heat storage power generation system of the present embodiment may include a single air sender configured to cause the heat transfer fluid 12c to flow to the heater 1 and cause the heat transfer fluid 13a to flow to the heat storage 2 instead of the first air sender 4a configured to cause the heat transfer fluid 12c to flow to the heater 1 and the second air sender 4b configured to cause the heat transfer fluid 13a to flow to the heat storage 2. In this case, the single air sender may include a switching device configured to switch between an air-sending path for the heat transfer fluid 12c and an air-sending path for the heat transfer fluid 13a.

In the warm-up mode of the present embodiment, the first and second air senders 4a and 4b are used to distribute (circulate) the heat transfer fluids 12a, 12b, and 12c between the heater 1 and the power generator 3. The heat storage power generation system of the present embodiment may operate any one of the first and second air senders 4a and 4b in the warm-up mode.

[A-5] Power Generation Output Meter 5

The power generation output meter 5 measures the power generation output 14 from the power generator 3 and outputs a power generation output measurement signal 15 indicating a result of the measurement of the power generation output 14. The measurement result of the power generation output 14 is, for example, an MW value of electric power output from the power generator 3. The power generation output measurement signal 15 of the present embodiment is input to the power generation controller 8.

[A-6] Temperature Meters 6, 6a, and 6b

The temperature meter 6 measures the internal temperature of the heat storage 2 and outputs a temperature measurement signal 16 indicating a result of the measurement of the internal temperature. The internal temperature of the heat storage 2 is temperature inside the heat storage 2. The temperature meter 6 of the present embodiment includes, for example, a temperature detector inserted into the heat storage material of the heat storage 2 and measures, as the internal temperature of the heat storage 2, the temperature of the heat storage material or the temperature of air or heat transfer fluid contained in the heat storage material. The temperature meter 6 of the present embodiment measures the internal temperature near the entrance of the heat storage 2 through which the heat transfer fluid 12a flows into the heat storage 2. The measurement result of the internal temperature is, for example, the value of the internal temperature measured by the heat storage 2. The temperature measurement signal 16 of the present embodiment is input to the heating controller 7.

The temperature meter 6a measures the temperature of the heat transfer fluid 12a upstream of the entrance of the heat storage 2 and outputs a temperature measurement signal 16a indicating a result of the measurement of the temperature of the heat transfer fluid 12a. The temperature measurement signal 16a of the present embodiment is input to the heating controller 7.

The temperature meter 6b measures the temperature of the heat transfer fluid 12b downstream of the exit of the heat storage 2 and outputs a temperature measurement signal 16b indicating a result of the measurement of the temperature of the heat transfer fluid 12b. The temperature measurement signal 16b of the present embodiment is input to the air-sending controller 9.

The temperature meters 6, 6a, and 6b measure temperature by using a thermocouple in the present embodiment but may measure temperature by any other method (for example, an infrared measurement method). In a case in which it is difficult to directly measure the internal temperature of the heat storage 2 and the temperatures of the heat transfer fluids 12a and 12b, the temperature meters 6, 6a, and 6b may be software sensors using an observer theory, a simulator, or the like.

[A-7] Heating Controller 7

The heating controller 7 receives the temperature measurement signals 16 and 16a and a heating command signal 17a and outputs a heating control signal 17 based on the received signals. In this manner, the heating controller 7 controls heating of the heat transfer fluid 12c (or the heat transfer fluids 12 and 13; this also applies in the following) by the heater 1. The heating controller 7 controls operation of the heater 1 so that, for example, the amount of energy consumption by the heater 1 or the temperature of the heat transfer fluid 12a becomes equal to a desired value.

Further details of the configuration and function of the heating controller 7 of the present embodiment will be described later in Section [B].

[A-8] Power Generation Controller 8

The power generation controller 8 receives the power generation output measurement signal 15 and a power generation command signal 18a and outputs a power generation control signal 18 based on the received signals. Specifically, the power generation controller 8 outputs the power generation control signal 18 to the power generator 3 to match the set value of the power generation output 14 indicated by the power generation command signal 18a and the measured value of the power generation output 14 indicated by the power generation output measurement signal 15. For example, in a case in which the measured value is higher than the set value, the power generation control signal 18 that decreases the power generation output 14 is output. In a case in which the measured value is lower than the set value, the power generation control signal 18 that increases the power generation output 14 is output. In this manner, the power generation controller 8 controls power generation performed by the power generator 3.

To control the power generator 3 as described above, for example, the power generation controller 8 measures various process amounts that are internal information of the power generator 3, and operates various operation ends in the power generator 3 based on the process amounts. The process amounts are, for example, the pressures, temperatures, and flow rates of heat transfer fluid, steam, and water. The operation ends are, for example, valves and pumps. The power generation controller 8 performs the control to match the set value and measured value of the power generation output 14 by, for example, proportional-integral-derivative (PID) control.

[A-9] Air-Sending Controller 9

The air-sending controller 9 receives the temperature measurement signal 16b and an air-sending command signal 19c and outputs air-sending control signals 19a and 19b based on the received signals. Specifically, the air-sending controller 9 controls operation of the first air sender 4a by using the first air-sending control signal 19a and controls operation of the second air sender 4b by using the second air-sending control signal 19b. The air-sending controller 9 can control distribution of the heat transfer fluids 12a to 12c between the heater 1 and the heat storage 2 by using the first air-sending control signal 19a and can control distribution of the heat transfer fluids 13a to 13c between the heat storage 2 and the power generator 3 by using the second air-sending control signal 19b. The air-sending controller 9 can control distribution of the heat transfer fluids 12 and 13 between the heater 1 and the power generator 3 by using the first and second air-sending control signals 19a and 19b.

[A-10] Flow Path Switching Controller 10 and Flow Path Switchers 21 to 26

Each of the flow path switchers 21 to 26 is, for example, a valve or a damper. The flow path switching controller 10 can control opening and closing of the flow path switchers 21 to 26 by outputting an open-close signal 20 to the flow path switchers 21 to 26. This makes it possible to control distribution of the heat transfer fluids 12 and 13 in the heat storage power generation system of the present embodiment.

The flow path switchers 21 and 22 are provided on the heat storage flow path M1. Specifically, the flow path switchers 21 and 22 are provided at positions that are included in the heat storage flow path M1 and not included in the warm-up flow path M3. In the present embodiment, the flow path switcher 21 is disposed near the entrance of the heat storage 2 for the heat transfer fluid 12, and the flow path switcher 22 is disposed near the exit of the heat storage 2 for the heat transfer fluid 12.

The flow path switchers 23 and 24 are provided on the heat-releasing flow path M2. Specifically, the flow path switchers 23 and 24 are provided at positions that are included in the heat-releasing flow path M2 and not included in the warm-up flow path M3. In the present embodiment, the flow path switcher 23 is disposed near the entrance of the heat storage 2 for the heat transfer fluid 13, and the flow path switcher 24 is disposed near the exit of the heat storage 2 for the heat transfer fluid 13.

The flow path switchers 25 and 26 are provided on the warm-up flow path M3. Specifically, the flow path switchers 21 and 22 are provided at positions that are included in the warm-up flow path M3 and not included in the heat storage flow path M1 nor the heat-releasing flow path M2. In the present embodiment, the flow path switcher 25 is disposed on the connecting flow path L1, and the flow path switcher 26 is disposed on the connecting flow path L2.

The flow path switching controller 10 of the present embodiment controls opening and closing of the flow path switchers 21 to 26 in accordance with the operation mode of the heat storage power generation system as follows.

In the heat storage mode, the flow path switchers 21 and 22 are opened and the flow path switchers 23, 24, 25, and 26 are closed. This makes it possible to distribute the heat transfer fluid 12 between the heater 1 and the heat storage 2.

In the heat releasing mode, the flow path switchers 23 and 24 are opened and the flow path switchers 21, 22, 25, and 26 are closed. This makes it possible to distribute the heat transfer fluid 13 between the heat storage 2 and the power generator 3.

In the warm-up mode, the flow path switchers 25 and 26 are opened and the flow path switchers 21, 22, 23, and 24 are closed. This makes it possible to distribute the heat transfer fluids 12 and 13 between the heater 1 and the power generator 3.

Although the heat storage power generation system of the present embodiment includes the six flow path switchers (21 to 26), the number of flow path switchers in the heat storage power generation system of the present embodiment may be other than six.

[B] Details of Heating Controller 7

Figure 3:
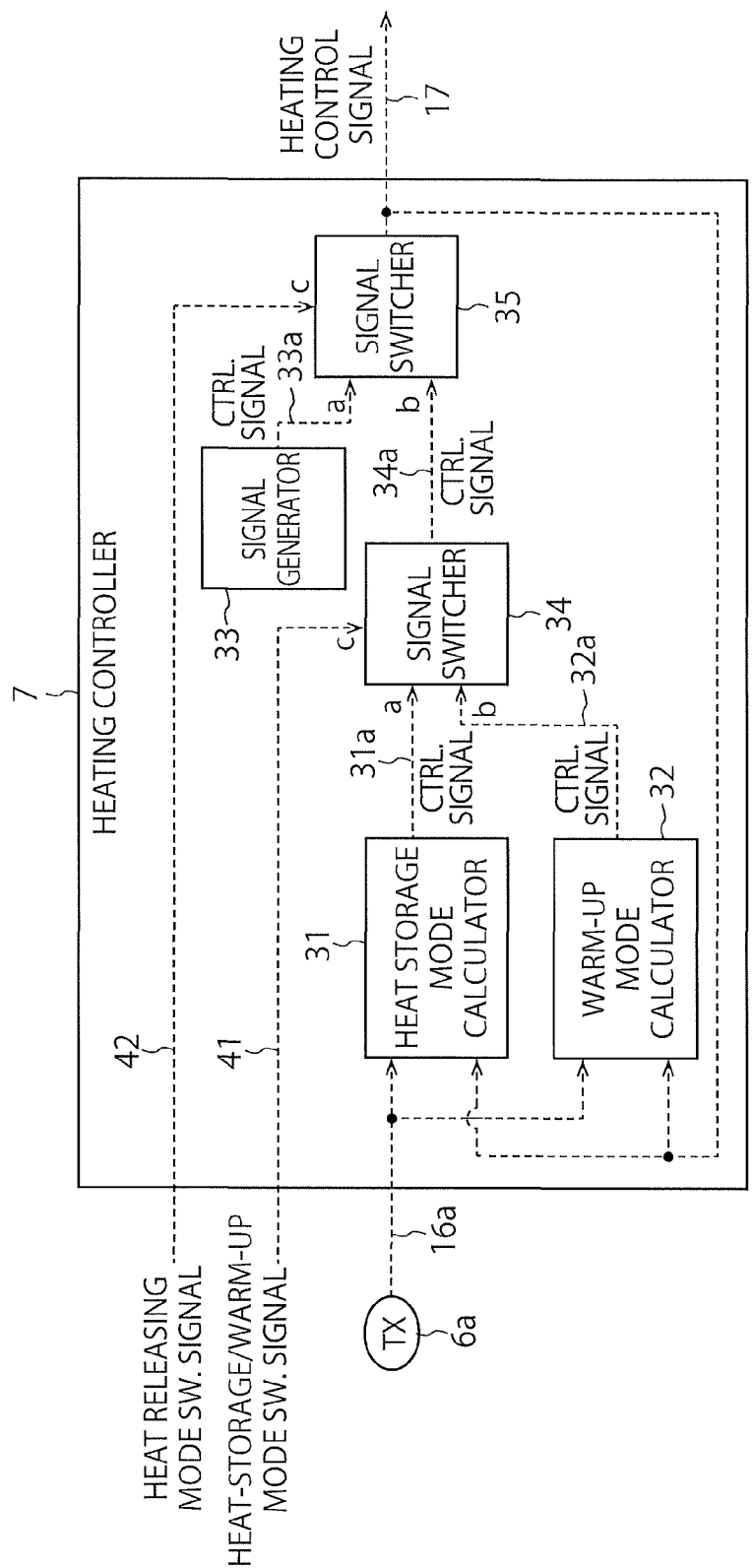
FIG. 3 is a schematic diagram illustrating the configuration of a heating controller of the first embodiment.

FIG. 3 is a schematic diagram illustrating the configuration of the heating controller 7 of the first embodiment.

The heating controller 7 of the present embodiment includes a heat storage mode calculator 31, a warm-up mode calculator 32, a signal generator 33, a signal switcher 34, and a signal switcher 35. FIG. 3 also illustrates a control signal 31a output from the heat storage mode calculator 31, a control signal 32a output from the warm-up mode calculator 32, a control signal 33a output from the signal generator 33, a control signal 34a output from the signal switcher 34, and the heating control signal 17 output from the signal switcher 35. FIG. 3 also illustrates the temperature measurement signal 16a, a heat-storage/warm-up mode switching signal 41, and a heat releasing mode switching signal 42 input to the heating controller 7.

When the heat storage power generation system of the present embodiment is operated in the heat storage mode, the temperature of the heat transfer fluid 12a entering the heat storage 2 needs to be controlled to a desired value by the heater 1. When the heat storage power generation system of the present embodiment is operated in the warm-up mode, the temperatures of the heat transfer fluids 12 and 13 entering the power generator 3 need to be controlled to a desired value by the heater 1. For these purposes, the heating controller 7 of the present embodiment has two modes of a heat storage mode control state and a warm-up mode control state.

Figure 4:
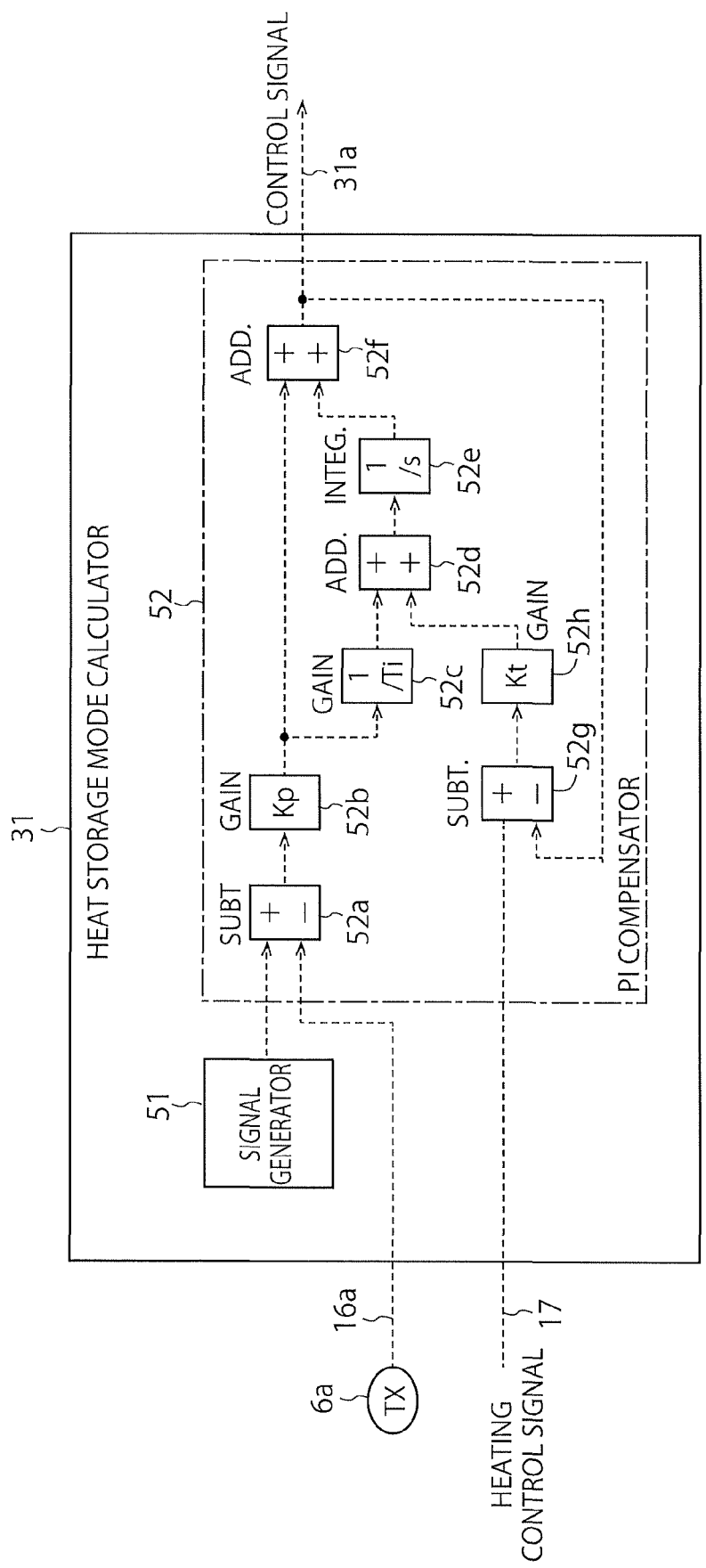
FIG. 4 is a schematic diagram illustrating the configuration of a heat storage mode calculator of the first embodiment.
Figure 5:
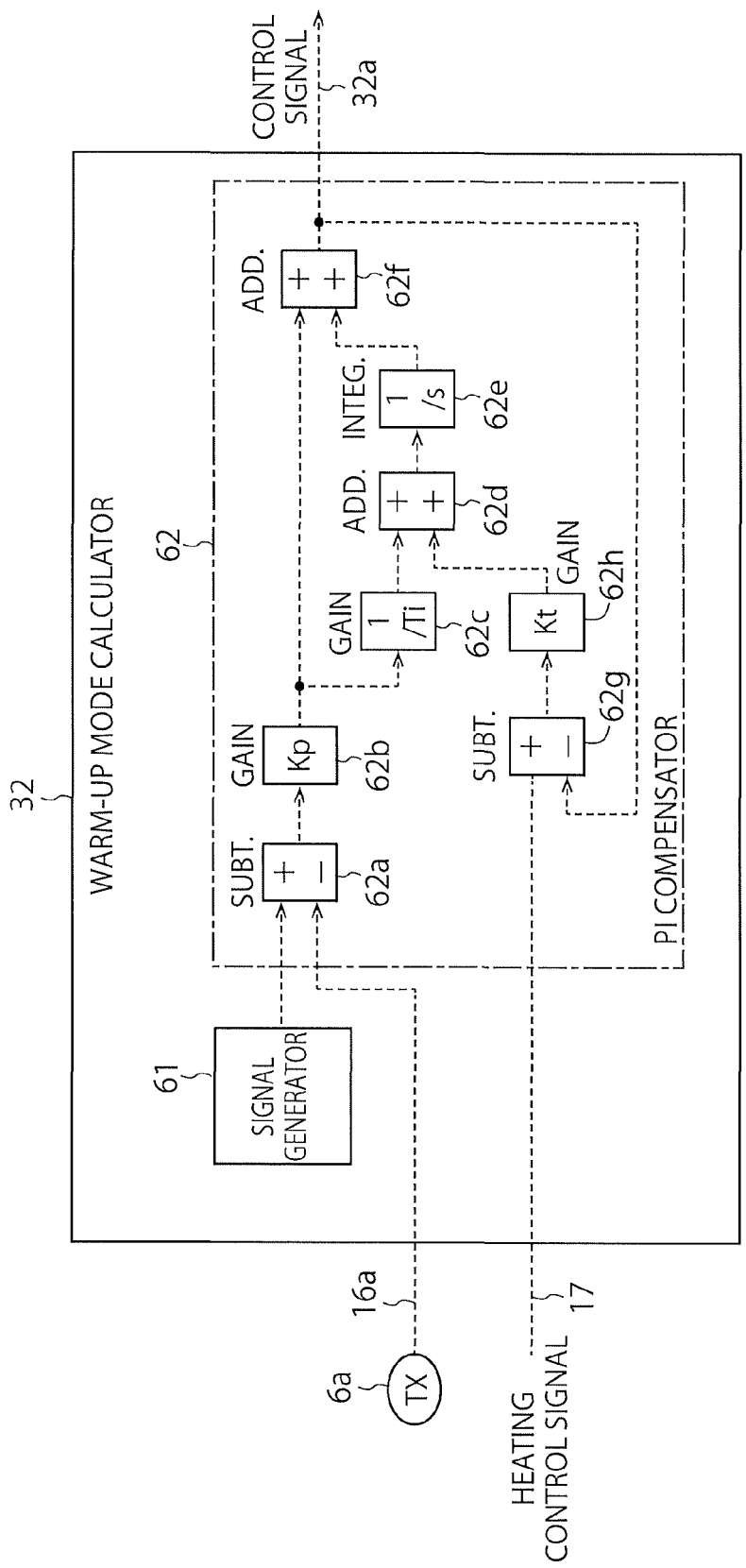
FIG. 5 is a schematic diagram illustrating the configuration of a warm-up mode calculator of the first embodiment.

The configuration of the heating controller 7 of the present embodiment will be described below with reference to FIG. 3. FIGS. 4 and 5 are referred as appropriate in the description. FIG. 4 is a schematic diagram illustrating the configuration of the heat storage mode calculator 31 of the present embodiment. FIG. 5 is a schematic diagram illustrating the configuration of the warm-up mode calculator 32 of the present embodiment.

[B-1] Heat Storage Mode Calculator 31

As illustrated in FIG. 4, the heat storage mode calculator 31 receives the temperature measurement signal 16a and the heating control signal 17 and outputs the control signal 31a. The heat storage mode calculator 31 includes a signal generator 51 and a proportional-integral (PI) compensator 52.

The signal generator 51 outputs a value set in advance. In the present embodiment, the desired value (for example, 600° C.) of the temperature of the heat transfer fluid 12a entering the heat storage 2 in the heat storage mode is set in the signal generator 51 in advance, and an output signal having this constant value is output from the signal generator 51 to the PI compensator 52. This makes it possible to supply the heat transfer fluid 12a having a preferable temperature to the heat storage 2 in the heat storage mode.

The PI compensator 52 includes a subtractor 52a, a gain setter 52b, a gain setter 52c, an adder 52d, an integrator 52e, an adder 52f, a subtractor 52g, and a gain setter 52h.

The subtractor 52a receives the above-described output signal (set value) from the signal generator 51 and receives the temperature measurement signal 16a (process value) from the temperature meter 6a. The PI compensator 52 performs compensation operation by setting an appropriate numerical value to each of the gain setters 52b, 52c, and 52h so that the difference between the set value and the process value is zero. Specifically, the PI compensator 52 outputs the control signal 31a with which the difference between each set value and the process value becomes closer to zero. The subtractor 52a, the integrator 52e, and the adder 52f perform subtraction, integration, and addition, respectively, for PI compensation.

The subtractor 52g receives the control signal 31a and the heating control signal 17 and outputs a result of subtraction between the control signal 31a and the heating control signal 17 to the gain setter 52h. The PI compensator 52 of the present embodiment inputs a signal produced by using the subtractor 52g and the gain setter 52h to the adder 52d and inputs, to the integrator 52e, not a signal from the gain setter 52c but a result of addition of the signal from the gain setter 52c and a signal from the gain setter 52h. This makes it possible to prevent reset-wind-up operation, in other words, cause the control signal 31a to automatically track the heating control signal 17.

[B-2] Warm-Up Mode Calculator 32

As illustrated in FIG. 5, the warm-up mode calculator 32 receives the temperature measurement signal 16a and the heating control signal 17 and outputs the control signal 32a. The warm-up mode calculator 32 includes a signal generator 61 and a PI compensator 62.

The signal generator 61 outputs a value set in advance. In the present embodiment, the desired value (for example, 500° C.) of the temperatures of the heat transfer fluids 12 and 13 entering the power generator 3 in the warm-up mode is set in the signal generator 61 in advance, and an output signal having this constant value is output from the signal generator 61 to the PI compensator 62. This makes it possible to supply the heat transfer fluids 12 and 13 having a preferable temperature to the power generator 3 in the warm-up mode. In the present embodiment, the value (temperature) in the signal generator 61 is set to be lower than the value (temperature) in the signal generator 51.

The PI compensator 62 includes a subtractor 62a, a gain setter 62b, a gain setter 62c, an adder 62d, an integrator 62e, an adder 62f, a subtractor 62g, and a gain setter 62h.

The subtractor 62a receives the above-described output signal (set value) from the signal generator 61 and receives the temperature measurement signal 16a (process value) from the temperature meter 6a. The PI compensator 62 performs compensation operation by setting an appropriate numerical value to each of the gain setters 62b, 62c, and 62h so that the difference between the set value and the process value is zero. Specifically, the PI compensator 62 outputs the control signal 32a with which the difference between each set value and the process value becomes closer to zero. The subtractor 62a, the integrator 62e, and the adder 62f perform subtraction, integration, and addition, respectively, for PI compensation.

The subtractor 62g receives the control signal 32a and the heating control signal 17 and outputs a result of subtraction between the control signal 32a and the heating control signal 17 to the gain setter 62h. The PI compensator 62 of the present embodiment inputs a signal produced by using the subtractor 62g and the gain setter 62h to the adder 62d and inputs, to the integrator 62e, not a signal from the gain setter 62c but a result of addition of the signal from the gain setter 62c and a signal from the gain setter 62h. This makes it possible to prevent reset-wind-up operation, in other words, cause the control signal 32a to automatically track the heating control signal 17.

[B-3] Signal Generator 33

The signal generator 33 (FIG. 3) outputs a value set in advance. In the present embodiment, a desired value of zero for the heating control signal 17 in the heat releasing mode is set in the signal generator 33 in advance, and the control signal 33a having this constant value of zero is output from the signal generator 33 to the signal switcher 35.

[B-4] Signal switcher 34

The signal switcher 34 includes an input terminal "a" to which the control signal 31a from the heat storage mode calculator 31 is input, an input terminal "b" to which the control signal 32a from the warm-up mode calculator 32 is input, and a control terminal "c" to which the heat-storage/warm-up mode switching signal 41 is input.

When the heat-storage/warm-up mode switching signal 41 has the value of "True", the signal switcher 34 outputs the "a" side value. When the heat-storage/warm-up mode switching signal 41 has the value of "False", the signal switcher 34 outputs the "b" side value. Accordingly, when the heat-storage/warm-up mode switching signal 41 has the value of "True", the control signal 31a is output as the control signal 34a. When the heat-storage/warm-up mode switching signal 41 has the value of "False", the control signal 32a is output as the control signal 34a. The heat-storage/warm-up mode switching signal 41 has the value of "True" in a case of operation in the heat storage mode and has the value of "False" in a case of operation in the warm-up mode.

[B-5] Signal Switcher 35

The signal switcher 35 includes an input terminal "a" to which the control signal 33a from the signal generator 33 is input, an input terminal "b" to which the control signal 34a from the signal switcher 34 is input, and a control terminal "c" to which the heat releasing mode switching signal 42 is input.

When the heat releasing mode switching signal 42 has the value of "True", the signal switcher 35 outputs the "a" side value. When the heat releasing mode switching signal 42 has the value of "False", the signal switcher 35 outputs the "b" side value. Accordingly, when the heat releasing mode switching signal 42 has the value of "True", the control signal 33a is output as the heating control signal 17. When the heat releasing mode switching signal 42 has the value of "False", the control signal 34a is output as the heating control signal 17.

With the above-described configurations and functions, the heating controller 7 of the present embodiment can control the temperatures of the heat transfer fluids 12 and 13 to a desired value in accordance with the two modes of the heat storage mode control state and the warm-up mode control state. In the heat storage power generation system of the present embodiment, opening and closing of the flow path switchers 21 to 26 can be controlled in accordance with a mode by the flow path switching controller 10, and the temperatures of the heat transfer fluids 12 and 13 can be controlled in accordance with a mode by the heating controller 7.

As described above, the heat storage power generation system of the present embodiment can be operated not only in the heat storage mode and the heat releasing mode but also in the warm-up mode. The heat storage power generation system of the present embodiment can warm up the power generator 3 by using the heat transfer fluid 12 for the heat storage mode and the heat transfer fluid 13 for the heat releasing mode by switching the flow paths of the heat transfer fluids 12 and 13 through the flow path switchers 21 to 26 in the warm-up mode.

The present embodiment makes it possible to efficiently use energy in the heater 1, the heat storage 2, and the power generator 3. For example, in a case in which the energy input 11 exceeds the amount of energy that can be stored in the heat storage 2, it is possible to switch the mode of the heat storage power generation system from the heat storage mode to the warm-up mode and warm up the power generator 3 in advance by using surplus energy (surplus electric power). Moreover, the present embodiment makes it possible to perform warm-up mode operation to effectively utilize surplus electric power and shorten a waiting time until power generation start.

Second Embodiment

[A] Overall Configuration

Figure 6:
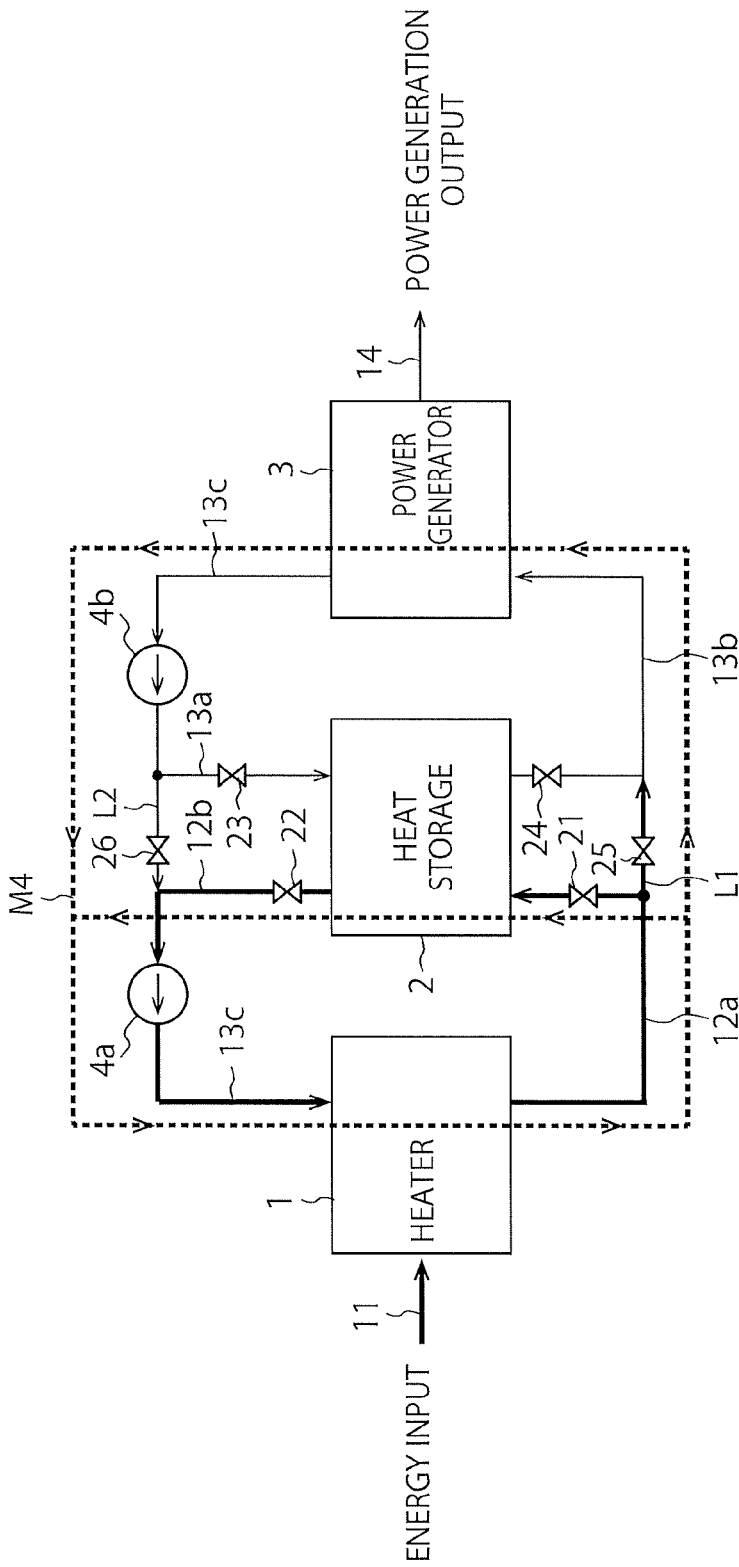
FIG. 6 is a schematic diagram for description of operation of a heat storage power generation system of a second embodiment.

FIG. 6 is a schematic diagram for description of operation of a heat storage power generation system of a second embodiment.

Similarly to the heat storage power generation system of the first embodiment, the heat storage power generation system of the present embodiment has the configuration illustrated in FIG. 1. However, the heat storage power generation system of the present embodiment can be operated not only in the above-described heat storage mode, heat releasing mode, and warm-up mode but also in a heat-storage/warm-up mode in which heat storage and warm-up are simultaneously performed. The heat-storage/warm-up mode of the present embodiment will be described below with reference to FIG. 6.

[A-1] Heater 1, Heat Storage 2, and Power Generator 3

In the heat-storage/warm-up mode, the heat transfer fluids 12 and 13 circulate between the heater 1 and the heat storage 2 and between the heater 1 and the power generator 3. Reference sign M4 in FIG. 6 denotes a situation in which the heat transfer fluids 12 and 13 circulates between the heater 1 and the heat storage 2 and between the heater 1 and the power generator 3 in the heat-storage/warm-up mode. Hereinafter, the flow path of the heat transfer fluids 12 and 13 denoted by reference sign M4 is also referred to as a "heat-storage/warm-up flow path M4".

In the heat-storage/warm-up mode, the heat transfer fluids 12 and 13 at high temperature are bifurcated at the entrance of the connecting flow path L1. One of bifurcated portions of the heat transfer fluids 12 and 13 enters the heat storage 2, and the other of the bifurcated portions of the heat transfer fluids 12 and 13 enters the power generator 3. The heat storage material in the heat storage 2 is heated with the former portion of the heat transfer fluids 12 and 13, and the power generator 3 is warmed up with the latter portion of the heat transfer fluids 12 and 13. As a result, the temperatures of both portions of the heat transfer fluids 12 and 13 fall, and the portions become the heat transfer fluids 12 and 13 at low temperature and are merged at the exit of the connecting flow path L2. The merged heat transfer fluids 12 and 13 enter the heater 1 and are heated by the heater 1. As a result, the temperatures of the merged heat transfer fluids 12 and 13 rise, and the merged heat transfer fluids 12 and 13 become the heat transfer fluids 12 and 13 at high temperature and are bifurcated again at the entrance of the connecting flow path L1. In this manner, heat storage and warm-up are simultaneously performed in the heat-storage/warm-up mode.

[A-2] Flow Path Switching Controller 10 and Flow Path Switchers 21 to 26

The flow path switching controller 10 of the present embodiment controls opening and closing of the flow path switchers 21 to 26 to form the heat-storage/warm-up flow path M4 in the heat-storage/warm-up mode of the heat storage power generation system. Specifically, the flow path switching controller 10 opens the flow path switchers 21, 22, 25, and 26 and closes the flow path switchers 23 and 24 in the heat-storage/warm-up mode. This makes it possible to distribute the heat transfer fluids 12 and 13 between the heater 1 and the heat storage 2 and between the heater 1 and the power generator 3.

[B] Details of Heating Controller 7

Figure 7:
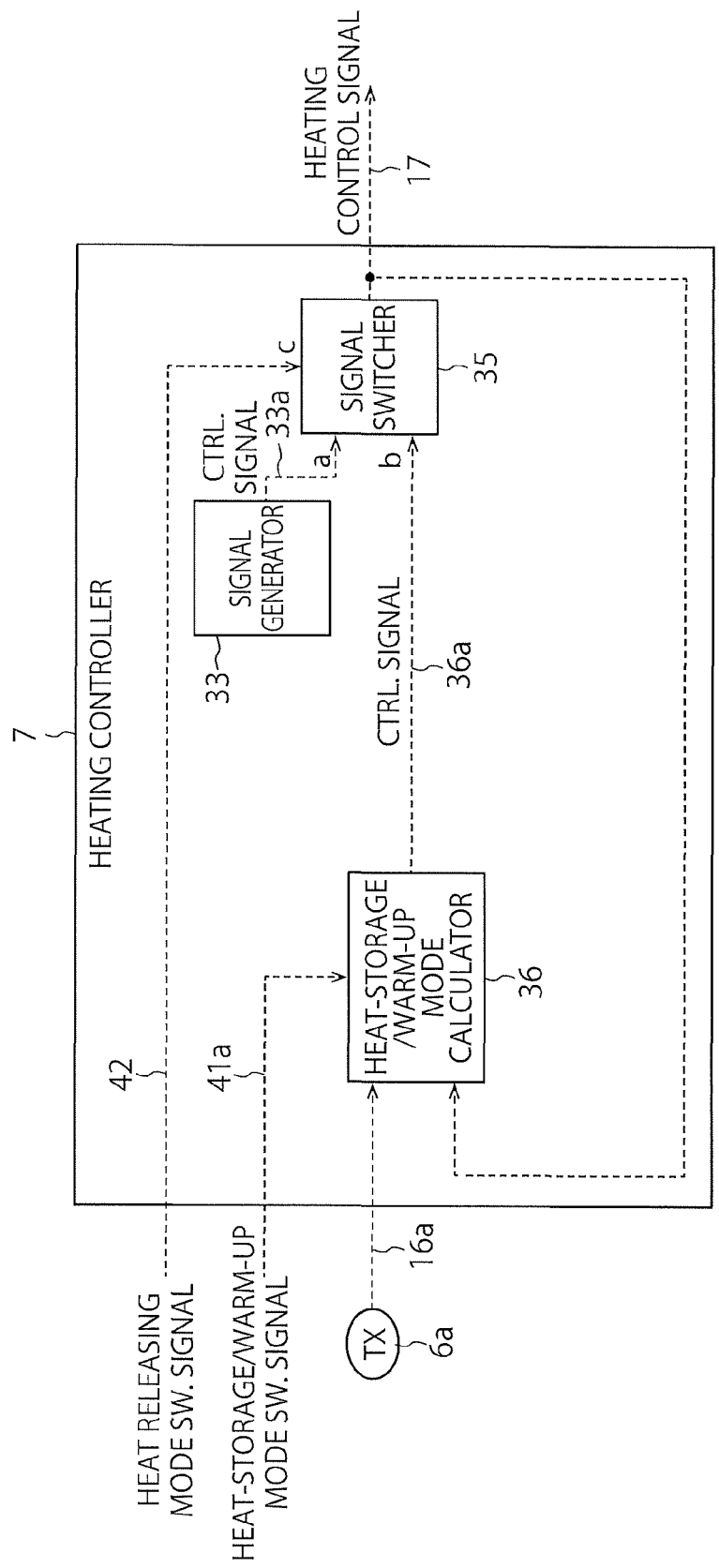
FIG. 7 is a schematic diagram illustrating the configuration of a heating controller of the second embodiment.

FIG. 7 is a schematic diagram illustrating the configuration of the heating controller 7 of the second embodiment.

The heating controller 7 of the present embodiment includes a heat-storage/warm-up mode calculator 36, the signal generator 33, and the signal switcher 35. FIG. 7 also illustrates a control signal 36a output from the heat-storage/warm-up mode calculator 36, the control signal 33a output from the signal generator 33, and the heating control signal 17 output from the signal switcher 35. FIG. 7 also illustrates the temperature measurement signal 16a, a heat-storage/warm-up mode switching signal 41a, and the heat releasing mode switching signal 42 input to the heating controller 7.

When the heat storage power generation system of the present embodiment is operated in the heat storage mode, the temperature of the heat transfer fluid 12a entering the heat storage 2 needs to be controlled to a desired value by the heater 1. When the heat storage power generation system of the present embodiment is operated in the heat-storage/warm-up mode, the temperatures of the heat transfer fluids 12 and 13 entering the heat storage 2 and the power generator 3 need to be controlled to a desired value by the heater 1. For these purposes, the heating controller 7 of the present embodiment has two modes of the heat storage mode control state and a heat-storage/warm-up mode control state.

Similarly to the heating controller 7 of the first embodiment, the heating controller 7 of the present embodiment may also have the warm-up mode control state. In the warm-up mode control state, the temperatures of the heat transfer fluids 12 and 13 entering the power generator 3 are controlled to a desired value by the heater 1. However, since the heating controller 7 of the present embodiment controls the temperatures of the heat transfer fluids 12 and 13 to the same value in the warm-up mode and the heat-storage/warm-up mode, the warm-up mode control state of the heating controller 7 and the heat-storage/warm-up mode control state of the heating controller 7 are the same state.

Figure 8:
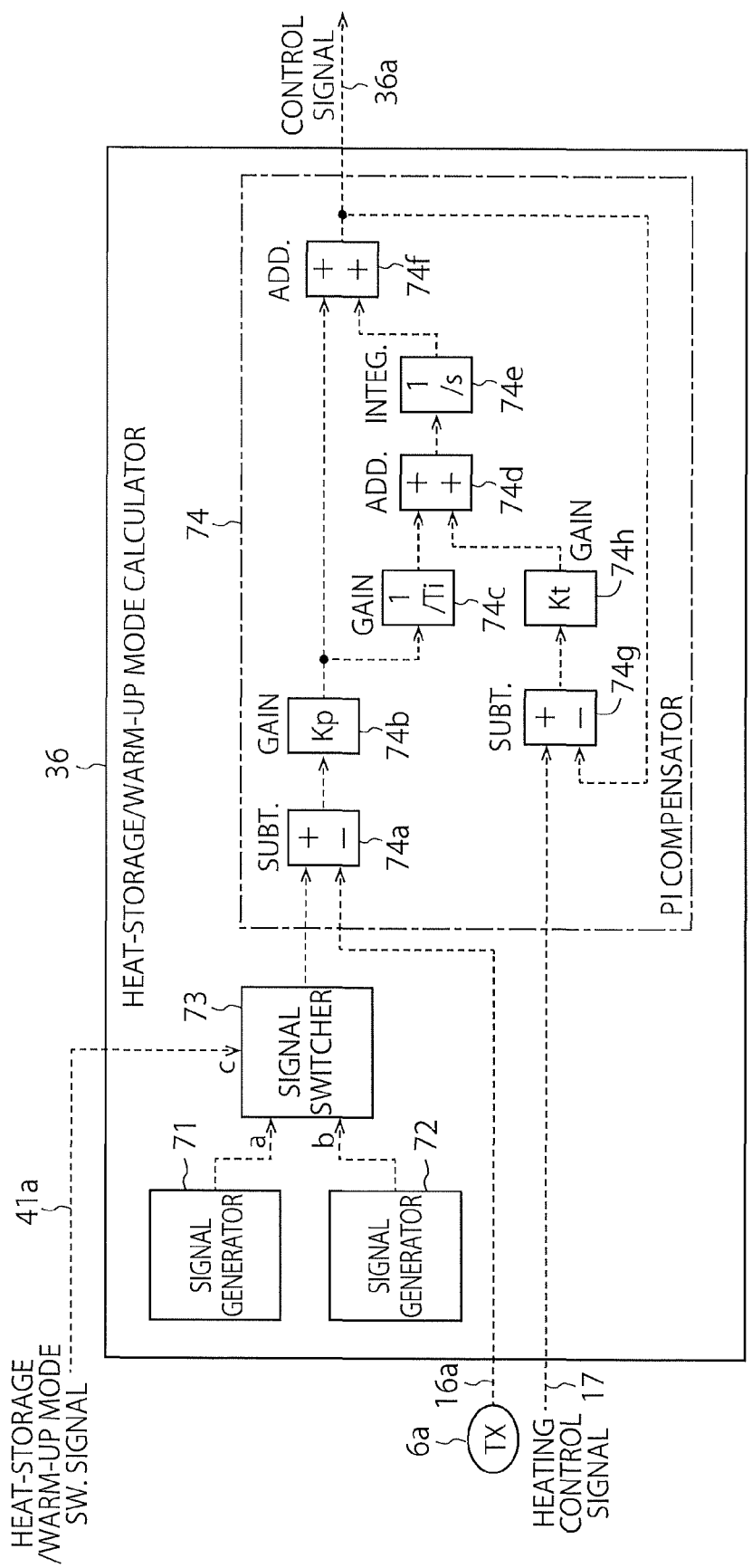
FIG. 8 is a schematic diagram illustrating the configuration of a heat-storage/warm-up mode calculator of the second embodiment.

The configuration of the heating controller 7 of the present embodiment will be described below with reference to FIG. 7. FIG. 8 is referred as appropriate in the description. FIG. 8 is a schematic diagram illustrating the configuration of the heat-storage/warm-up mode calculator 36 of the present embodiment.

[B-1] Heat-Storage/Warm-Up Mode Calculator 36

As illustrated in FIG. 8, the heat-storage/warm-up mode calculator 36 receives the temperature measurement signal 16a, the heating control signal 17, and the heat-storage/warm-up mode switching signal 41a and outputs the control signal 36a. The heat-storage/warm-up mode calculator 36 includes a signal generator 71, a signal generator 72, a signal switcher 73, and a PI compensator 74.

The signal generator 71 outputs a value set in advance. In the present embodiment, the desired value (for example, 600° C.) of the temperature of the heat transfer fluid 12a entering the heat storage 2 in the heat storage mode is set in the signal generator 71 in advance, and an output signal having this constant value is output from the signal generator 71 to the signal switcher 73. This makes it possible to supply the heat transfer fluid 12a having a preferable temperature to the heat storage 2 in the heat storage mode.

The signal generator 72 outputs a value set in advance. In the present embodiment, the desired value (for example, 500° C.) of the temperatures of the heat transfer fluids 12 and 13 entering the heat storage 2 and the power generator 3 in the heat-storage/warm-up mode is set in the signal generator 72 in advance, and an output signal having this constant value is output from the signal generator 72 to the signal switcher 73. This makes it possible to supply the heat transfer fluids 12 and 13 having a preferable temperature to the heat storage 2 and the power generator 3 in the heat-storage/warm-up mode.

The signal switcher 73 includes an input terminal "a" to which the output signal from the signal generator 71 is input, an input terminal "b" to which the output signal from the signal generator 72 is input, and a control terminal "c" to which the heat-storage/warm-up mode switching signal 41a is input.

When the heat-storage/warm-up mode switching signal 41a has the value of "True", the signal switcher 73 outputs the "a" side value. When the heat-storage/warm-up mode switching signal 41a has the value of "False", the signal switcher 73 outputs the "b" side value. Accordingly, when the heat-storage/warm-up mode switching signal 41a has the value of "True", the output signal (for example, 500° C.) from the signal generator 71 is output from the signal switcher 73 to the PI compensator 74. When the heat-storage/warm-up mode switching signal 41a has the value of "False", the output signal (for example, 600° C.) from the signal generator 72 is output from the signal switcher 73 to the PI compensator 74. The heat-storage/warm-up mode switching signal 41a has the value of "True" in a case of operation in the heat-storage/warm-up mode and has the value of "False" in a case of operation in the heat storage mode.

The PI compensator 74 includes a subtractor 74a, a gain setter 74b, a gain setter 74c, an adder 74d, an integrator 74e, an adder 74f, a subtractor 74g, and a gain setter 74h.

The subtractor 74a receives the above-described output signal (set value) from the signal switcher 73 and receives the temperature measurement signal 16a (process value) from the temperature meter 6a. The PI compensator 74 performs compensation operation by setting an appropriate numerical value to each of gain setters 74b, 74c, and 74h so that the difference between the set value and the process value is zero. Specifically, the PI compensator 74 outputs the control signal 36a with which the difference between each set value and the process value becomes closer to zero. The subtractor 74a, the integrator 74e, and the adder 74f perform subtraction, integration, and addition, respectively, for PI compensation.

The subtractor 74g receives the control signal 36a and the heating control signal 17 and outputs a result of subtraction between the control signal 36a and the heating control signal 17 to the gain setter 74h. The PI compensator 74 of the present embodiment inputs a signal produced by using the subtractor 74g and the gain setter 74h to the adder 74d and inputs, to the integrator 74e, not a signal from the gain setter 74c but a result of addition of the signal from the gain setter 74c and a signal from the gain setter 74h. This makes it possible to prevent reset-wind-up operation, in other words, cause the control signal 36a to automatically track the heating control signal 17.

[B-2] Signal Generator 33

The signal generator 33 (FIG. 7) outputs a value set in advance. In the present embodiment, a desired value of zero for the heating control signal 17 in the heat releasing mode is set in the signal generator 33 in advance, and the control signal 33a having this constant value of zero is output from the signal generator 33 to the signal switcher 35.

[B-3] Signal Switcher 35

The signal switcher 35 includes an input terminal "a" to which the control signal 33a from the signal generator 33 is input, an input terminal "b" to which the control signal 36a from the heat-storage/warm-up mode calculator 36 is input, and a control terminal "c" to which the heat releasing mode switching signal 42 is input.

When the heat releasing mode switching signal 42 has the value of "True", the signal switcher 35 outputs the "a" side value. When the heat releasing mode switching signal 42 has the value of "False", the signal switcher 35 outputs the "b" side value. Accordingly, when the heat releasing mode switching signal 42 has the value of "True", the control signal 33a is output as the heating control signal 17. When the heat releasing mode switching signal 42 has the value of "False", the control signal 36a is output as the heating control signal 17.

With the above-described configurations and functions, the heating controller 7 of the present embodiment can control the temperatures of the heat transfer fluids 12 and 13 to a desired value in accordance with the two modes of the heat storage mode control state and the heat-storage/warm-up mode control state. In the heat storage power generation system of the present embodiment, opening and closing of the flow path switchers 21 to 26 can be controlled in accordance with a mode by the flow path switching controller 10, and the temperatures of the heat transfer fluids 12 and 13 can be controlled in accordance with a mode by the heating controller 7.

As described above, the heat storage power generation system of the present embodiment can be operated not only in the heat storage mode and the heat releasing mode but also in the heat-storage/warm-up mode. The heat storage power generation system of the present embodiment can perform heat storage and warm-up by using the heat transfer fluid 12 for the heat storage mode and the heat transfer fluid 13 for the heat releasing mode by switching the flow paths of the heat transfer fluids 12 and 13 through the flow path switchers 21 to 26 in the heat-storage/warm-up mode.

The present embodiment makes it possible to efficiently use energy in the heater 1, the heat storage 2, and the power generator 3. For example, when the amount of heat storage energy in the heat storage 2 is about to reach an upper limit value, it is possible to switch the mode of the heat storage power generation system from the heat storage mode to the heat-storage/warm-up mode and warm up the power generator 3 in advance by using surplus energy (surplus electric power). Moreover, the present embodiment makes it possible to perform heat-storage/warm-up mode operation to effectively utilize surplus electric power and shorten a waiting time until power generation start. The present embodiment makes it possible to operate the heat storage power generation system in the heat-storage/warm-up mode in accordance with various surplus electric power situations.

OTHER EMBODIMENTS

Although the heating controller 7 of the first embodiment and the heating controller 7 of the second embodiment have configurations different from each other, it is possible to use the heating controller 7 of the second embodiment in the warm-up operation of the first embodiment. Specifically, in the warm-up operation of the first embodiment, it is possible to use the configurations illustrated in FIGS. 7 and 8 in place of the configurations illustrated in FIGS. 3, 4, and 5. In this case, the heat-storage/warm-up mode switching signal 41 is used in place of the heat-storage/warm-up mode switching signal 41a in the warm-up operation of the first embodiment. Moreover, it is possible to use the heating controller 7 of the first embodiment in the warm-up operation of the second embodiment. Specifically, in the warm-up operation of the second embodiment, it is possible to use the configurations illustrated in FIGS. 3, 4, and 5 in place of the configurations illustrated in FIGS. 7 and 8. In this case, the heat-storage/warm-up mode switching signal 41a is used in place of the heat-storage/warm-up mode switching signal 41 in the warm-up operation of the second embodiment.

The heat storage mode calculator 31 and the warm-up mode calculator 32 of the first embodiment have simple feedback control configurations using the temperature measurement signal 16a but may have more complicated feedback control configurations. For example, the feedback control configurations of the heat storage mode calculator 31 and the warm-up mode calculator 32 may use one or both of the temperature measurement signal 16 and the temperature measurement signal 16a in addition to the temperature measurement signal 16a.

The heat storage mode calculator 31 and the warm-up mode calculator 32 of the first embodiment have feedback control configurations using the PI compensators 52 and 62, respectively but may have feedback control configurations using other compensators. Examples of such compensators include P compensators, I compensators, and PID compensators. Alternatively, the heat storage mode calculator 31 and the warm-up mode calculator 32 of the first embodiment may have feedback control configurations using optimum regulator, model prediction control, $H\infty$ control, or the like in place of the PI compensators 52 and 62.

The heat storage mode calculator 31 and the warm-up mode calculator 32 of the first embodiment include the PI compensators 52 and 62 of position-type configurations but may include PI compensators of speed-type configurations instead.

The above description is also applicable e to the heat-storage/warm-up mode calculator 36 of the second embodiment.

While certain embodiments have been described, these embodiments have been presented by way of example only, and are not intended to limit the scope of the inventions. Indeed, the novel systems described herein may be embodied in a variety of other forms; furthermore, various omissions, substitutions and changes in the form of the systems described herein may be made without departing from the spirit of the inventions. The accompanying claims and their equivalents are intended to cover such forms or modifications as would fall within the scope and spirit of the inventions.

The invention claimed is:

1. A heat storage power generation system comprising:
a heater configured to heat first heat transfer fluid;
a heat storage including a heat storage material heated by the first heat transfer fluid, and configured to heat second heat transfer fluid with heat stored in the heat storage material;
a power generator configured to generate electric power by using the second heat transfer fluid;
one or more first flow path switchers provided on a first flow path through which the first heat transfer fluid is circulated between the heater and the heat storage;
one or more second flow path switchers provided on a second flow path through which the second heat transfer fluid is circulated between the heat storage and the power generator;
one or more third flow path switchers provided on a third flow path through which at least one of the first and second heat transfer fluids is circulated between the heater and the power generator; and
a flow path switching controller configured to control the first, second and third flow path switchers,
wherein the flow path switching controller opens the first flow path switchers, closes the second flow path switchers, and opens the third flow path switchers in heat-storage and warm-up mode in which the heat storage material is heated with the first and second heat transfer fluids and the power generator is warmed up with the first and second heat transfer fluids before the power generator starts to generate the electric power.

2. The system of claim 1, further comprising:
a heating controller configured to control heating of the first heat transfer fluid by the heater; and
a power generation controller configured to control power generation performed by the power generator.

3. The system of claim 2, further comprising one or more temperature meters configured to measure the internal temperature, or the temperature of the first heat transfer fluid,
wherein the heating controller controls the heating of the first heat transfer fluid based on the internal temperature, or the temperature of the first heat transfer fluid, which is measured by the temperature meters.

4. The system of claim 1, further comprising:
a first air sender configured to circulate the first heat transfer fluid between the heater and the heat storage;
a second air sender configured to circulate the second heat transfer fluid between the heat storage and the power generator; and
an air-sending controller configured to control operation of the first and second air senders.

5. A power generation control system configured to control a heat storage power generation system including:
a heater configured to heat first heat transfer fluid;
a heat storage including a heat storage material heated by the first heat transfer fluid, and configured to heat second heat transfer fluid with heat stored in the heat storage material; and
a power generator configured to generate electric power by using the second heat transfer fluid,
the power generation control system comprising:
one or more first flow path switchers provided on a first flow path through which the first heat transfer fluid is circulated between the heater and the heat storage;
one or more second flow path switchers provided on a second flow path through which the second heat transfer fluid is circulated between the heat storage and the power generator;
one or more third flow path switchers provided on a third flow path through which at least one of the first and second heat transfer fluids is circulated between the heater and the power generator; and
a flow path switching controller configured to control the first, second and third flow path switchers,
wherein the flow path switching controller opens the first flow path switchers, closes the second flow path switchers, and opens the third flow path switchers in a heat-storage and warm-up mode in which the heat storage material is heated with the first and second heat transfer fluids and the power generator is warmed up with the first and second heat transfer fluids before the power generator starts to generate the electric power.

* * * * *